United States Patent
Van Vaerenbergh et al.

(10) Patent No.: US 11,090,729 B2
(45) Date of Patent: Aug. 17, 2021

(54) METHOD AND DEVICE FOR CLEANING AND/OR REPLACEMENT OF A LASER WINDOW OF A PROCESS CHAMBER

(71) Applicant: 3D Systems, Inc., Rock Hill, SC (US)

(72) Inventors: Jonas Van Vaerenbergh, Nieuwkerken-Waas (BE); Brawley Valkenborgs, Kessel-lo (BE)

(73) Assignee: 3D Systems, Inc., Rock Hill, SC (US)

( * ) Notice: Subject to any disclaimer, the term of this patent is extended or adjusted under 35 U.S.C. 154(b) by 95 days.

(21) Appl. No.: 16/001,636

(22) Filed: Jun. 6, 2018

(65) Prior Publication Data
US 2018/0345375 A1    Dec. 6, 2018

(51) Int. Cl.
*B22F 12/00* (2021.01)
*B33Y 30/00* (2015.01)
(Continued)

(52) U.S. Cl.
CPC .............. *B22F 12/00* (2021.01); *B22F 12/38* (2021.01); *B22F 12/41* (2021.01); *B23K 26/123* (2013.01); *B23K 26/127* (2013.01); *B23K 26/1224* (2015.10); *B23K 26/706* (2015.10); *B33Y 10/00* (2014.12); *B33Y 30/00* (2014.12);
(Continued)

(58) Field of Classification Search
CPC .......... B22F 12/00; B22F 12/41; B22F 12/38; B22F 10/10; B22F 10/70; B22F 10/20; B22F 10/00; B33Y 30/00; B33Y 10/00; B33Y 40/00; B23K 26/127; B23K 26/123; B23K 26/706; B23K 26/1224; B08B 15/02; Y02P 10/25; H01L 21/67028; H01L 21/67126; H01L 21/02041

See application file for complete search history.

(56) References Cited

U.S. PATENT DOCUMENTS 8,070,474 B2   12/2011   Abe et al.
8,895,893 B2   11/2014   Perret et al.
(Continued)

FOREIGN PATENT DOCUMENTS

CN   205130419     4/2016
CN   106738905 A   5/2017
(Continued)

OTHER PUBLICATIONS

European Search Report and Written Opinion for EP 18176380.6 dated Oct. 22, 2018 (8 pages).
(Continued)

*Primary Examiner* — Rebecca Janssen

(57) ABSTRACT

A device is provided for cleaning and/or replacement of a laser window of a process chamber, enclosed by an outer wall, containing a modified atmosphere, in particular a process chamber for layered printing of a 3D object by a technique such as Selective Laser Sintering (SLS), where this device features an opening in the outer wall that is fitted with the laser window and where this laser window allows a laser beam from a laser source located outside of the process chamber into the process chamber, where an external sealing ring is provided that extends between the outer wall and this laser window.
A method is also provided for cleaning and/or replacement of the laser window in the opening of the outer wall of the enclosed process chamber.

14 Claims, 2 Drawing Sheets

(51) Int. Cl.
  *B23K 26/12* (2014.01)
  *B22F 12/41* (2021.01)
  *B08B 15/02* (2006.01)
  *B33Y 40/00* (2020.01)
  *B23K 26/70* (2014.01)
  *B33Y 10/00* (2015.01)
  *B22F 10/10* (2021.01)

(52) U.S. Cl.
  CPC ............... *B33Y 40/00* (2014.12); *B08B 15/02* (2013.01); *B22F 10/10* (2021.01)

(56) References Cited

U.S. PATENT DOCUMENTS

| | | | |
|---|---|---|---|
| 2013/0341313 | A1 | 12/2013 | Himmelsbach et al. |
| 2017/0341143 | A1 | 11/2017 | Satoshi et al. |
| 2020/0139630 | A1* | 5/2020 | Prucha .................. B29C 64/245 |

FOREIGN PATENT DOCUMENTS

| | | |
|---|---|---|
| DE | 1138513 | 10/1962 |
| JP | H03229632 | 10/1991 |
| JP | 04-056144 H | 2/1992 |
| JP | 1992-56144 | 2/1992 |
| KR | 10-2009-0035713 | 4/2009 |
| WO | 2007112808 | 10/2007 |
| WO | 2016103686 | 6/2016 |

OTHER PUBLICATIONS

English Translation of Korean Intellectual Property Office ("KIPO") Notice of Preliminary Rejection for Korean Patent Application No. 10-2018-0065628 (5 pages).
English translation of Abstract for Cited Reference 2, JPH 04-056144 (1 page).
English Translation of China's First Office Action dated Jan. 3, 2020 for Chinese Patent Application No. 201810574459.0 (13 pages).
English Translation of Japanese First Office Action for Japanese Patent Application No. 2018-108642 dated Aug. 1, 2019 (4 pages).

* cited by examiner

METHOD AND DEVICE FOR CLEANING AND/OR REPLACEMENT OF A LASER WINDOW OF A PROCESS CHAMBER

CROSS REFERENCE TO RELATED APPLICATIONS

This patent application claims priority to Belgium patent application serial number BE2017/5402, filed on Jun. 6, 2017, and incorporated herein by reference.

SUMMARY

According to the current state of the art, a laser window is provided in the process chamber that contains a modified atmosphere for processes such as "Direct Metal Printing" (SLM, DMLS, etc.), where metal is vaporized by processing with the laser beam.

These processes are known to the skilled person, as is the atmosphere needed for this in the process chamber. Supply of the desired atmosphere is highly time-consuming because it must be carried out in various steps. For instance, the process chamber must first be placed under a vacuum to remove all oxygen, etc. Next, the space is flushed by supplying nitrogen gas into the space, after which the space with the nitrogen atmosphere is placed under a vacuum again before the desired inert gas is supplied to create an inert atmosphere in the process chamber. Depending on the process applied, the atmosphere in the process chamber may also be changed by flushing with a desired inert gas without necessarily having to place the chamber under a vacuum first.

Here, the laser window forms a partition between the process chamber and the laser source and/or laser scanner and must therefore let the laser beam through while the process chamber must remain closed to retain the modified atmosphere. The laser source and/or laser scanner is therefore generally located outside of the process chamber.

Due to vaporization of metal in these processes, for instance, the laser window becomes contaminated. The contamination results in absorption of part of the laser power and thus also in heating of the laser window. This may result in what is known as "thermal lensing". This makes the melting process unstable, which manifests itself in residual porosity and increased roughness of the pieces produced.

To attempt to limit contamination of the laser window, gas flow systems are built into the inside of the laser window in combination with continuous filtration of the gas stream.

Nevertheless, this cannot prevent contamination of the inside of the laser window. It is therefore necessary to clean or replace the laser window, such as in cases of long processes. For this, the process must be interrupted for a long period of time. An operator must open the process chamber in order to clean the laser window on the inside, which also means that the modified atmosphere cannot be retained in this chamber. After the cleaning, this modified atmosphere must be recreated.

The invention seeks to offer a solution for this by providing a method and a device to enable cleaning and/or replacement of the laser window with retention of the modified atmosphere in the process chamber.

To this end, the laser window can be moved with respect to the opening and the device is fitted with a sealing plate that extends into the process room as required in the claims appended here.

For this purpose, the sealing plate is movable between an open position and a closed position, where the sealing plate seals the opening in the outer wall in the closed position and leaves the opening in the outer wall clear in the open position, where an internal sealing ring is provided that extends into the process chamber between the sealing plate and the outer wall around the opening when the sealing plate is located in the sealed position, where in this sealed position, a lock chamber is created that is bordered by the internal sealing ring, the sealing plate and the opening that is fitted with the laser window, and where an inlet and an outlet extend into the lock chamber for supply of the modified atmosphere in the lock chamber.

Advantageously, the device contains an internal guide that guides the sealing plate between the open position and the closed position, preferably, primarily parallel to the opening, the laser window and/or the outer wall.

According to an embodiment of the device, the internal sealing ring and/or the external sealing ring contain an inflatable seal.

The invention also relates to a method for cleaning or replacement of the laser window in the opening of the outer wall of the enclosed process chamber, as also required in the appended claims.

BRIEF DESCRIPTION OF FIGURES

Further details and advantages of the invention shall be indicated in the below description of some specific embodiments of the method and device, according to the invention. This description is only given as an example and does not restrict the scope of the protection claimed; the reference numerals used below pertain to the appended figures.

In the various figures, the same reference numerals pertain to the same or analogous members.

DETAILED DESCRIPTION OF PREFERRED EMBODIMENTS

In general, the invention relates to a device and a method for cleaning and/or replacement of a laser window of a process chamber. More specifically, the invention relates to a sealing plate which, in combination with an internal sealing ring, can create a lock chamber in the process chamber and in which the atmosphere can be created separately from this in the process chamber. This lock chamber is created in the process chamber around the opening in the outer wall that is fitted with the laser window. The invention relates in particular to application in a process chamber for layered manufacture of a 3D object, using processes with lasers which are themselves known to skilled persons.

Figure 1:
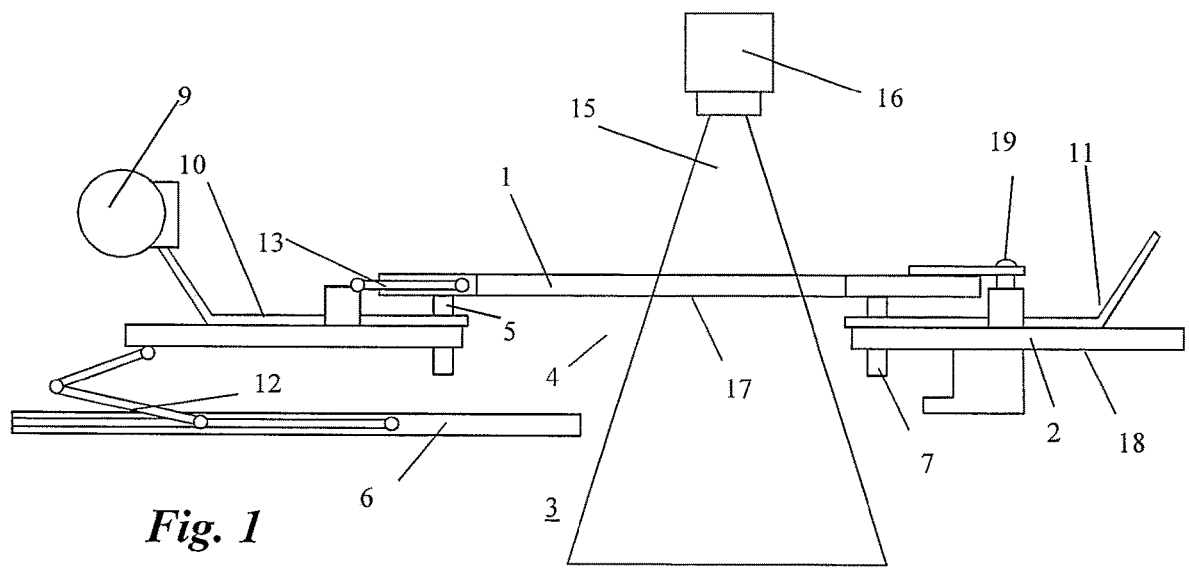
FIG. 1 is a schematic of a cross-section of a device according to an embodiment of the invention where the laser window is in the closed position while the sealing plate is in the open position.
Figure 2:
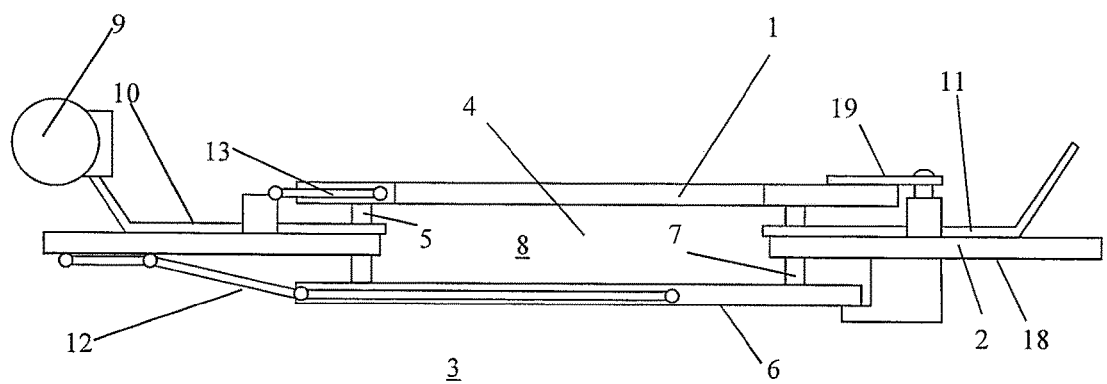
FIG. 2 is a schematic as in FIG. 1 with the laser window and also the sealing plate in the closed position.
Figure 3:
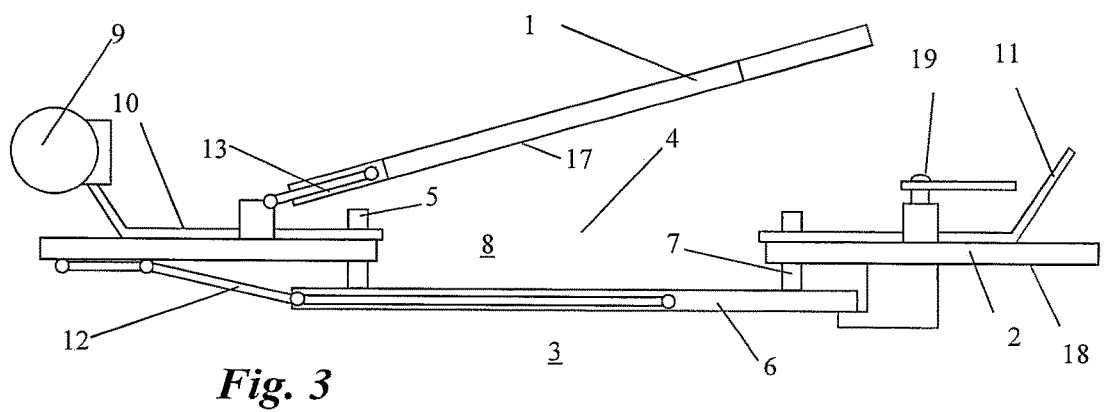
FIG. 3 is a schematic as in FIG. 1 with the laser window in the open position and the sealing plate in the closed position.

FIGS. 1 to 3 show a diagram of an embodiment of a device according to the invention.

During execution of the process, where a 3D object is manufactured in layers using a laser, the process chamber 3 is completely closed off in order to create a desired modified atmosphere that is needed for the manufacturing process.

The outer wall 2 of the process chamber 3 is fitted with an opening 4 that is closed off by means of a laser window 1 and an external sealing ring 5. Here, the sealing ring 5 closes tightly around the opening and against the laser window 1.

By providing the laser window 1 in the outer wall 2, the laser source 16 can be placed outside the process chamber 3. The window 1 enables a laser beam 15 to enter the process chamber 3.

During the process, the laser window 1 becomes contaminated on its inner side 17.

In order to clean the laser window 1 on the inner side 17, the opening 4 on the inner side 18 of the outer wall 2 is fitted with a sealing plate 6, as shown in FIG. 2.

By means of the mechanism 12, the sealing plate 6 is placed in front of the opening 4. An internal sealing ring 7 connects between the outer wall 2 and the sealing plate 6 so that the opening 4 is completely sealed from the process chamber 3. Preferably, the internal sealing ring 7 connects against the inner side 18 of the outer wall 2.

This creates a lock chamber 8 around the opening 4. This lock chamber 8 is bordered by the sealing plate 6, the laser window 1 and the internal and external sealing rings 5 and 7.

When, as shown in FIG. 2, the laser window 1 is moved to the open position by means of the external guide mechanism 13, which contains a hinge for instance, the lock chamber 8 is opened and the modified atmosphere dissipates from the lock chamber 8 while it is retained in the process chamber 3.

Here, the inner side 17 of the laser window 1 becomes accessible for cleaning, after which the lock chamber 8 can be closed again by moving the laser window 1 to the closed position. It is also possible here to replace the laser window 1 with a new laser window 1.

An outlet 10 and an inlet 11 let out into the lock chamber 8.

When the lock chamber 8 is closed again, a modified atmosphere is created in the lock chamber 8 that corresponds to the atmosphere of the process chamber 3.

For this, a vacuum may be created in the lock chamber 8 by means of the outlet 10 and a vacuum pump 9 connected to this, after which the lock chamber 8 is refilled with a desired gas via the inlet 11.

Alternatively, the inlet 11 and the outlet 10 may also consist of a single connection, which alternates between serving as an inlet and outlet, used both to create a vacuum and to supply gas again, not shown in the figures.

Moreover, it is also possible to change the atmosphere in the lock chamber 8 by only flushing this chamber 8 with a desired gas via the inlet 11 and the outlet 10, without necessarily creating a vacuum in the lock chamber 8 for this.

Finally, the sealing plate 6 can be moved back to the opened position as in FIG. 1.

According to a variant of the above embodiment, the internal and the external sealing rings 5 and 7, preferably, contain an inflatable sealing ring that is inflated for the seal.

Figure 5:
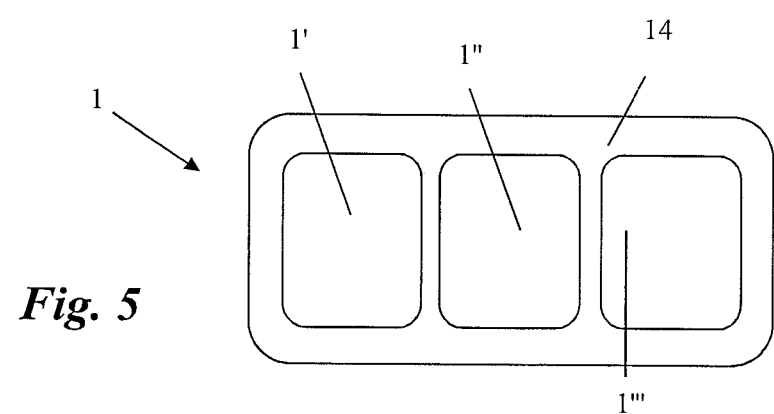
FIG. 5 is a schematic of a laser window consisting of multiple panes.

According to another variant of the above embodiment, as shown in FIG. 5, the laser window 1 is made up of an adapter plate 14 containing multiple laser panes 1, 1', 1".

According to a further variant of the above embodiment, the internal and/or external guide mechanisms 12 and/or 13 contain a guide rail and a drive unit, not shown in the figures. The drive unit may be hydraulic, pneumatic and/or electric, etc. Preferably, these mechanisms ensure guidance that is primarily parallel to the outer wall 2, the opening 4 and/or the laser window 1.

Figure 4:
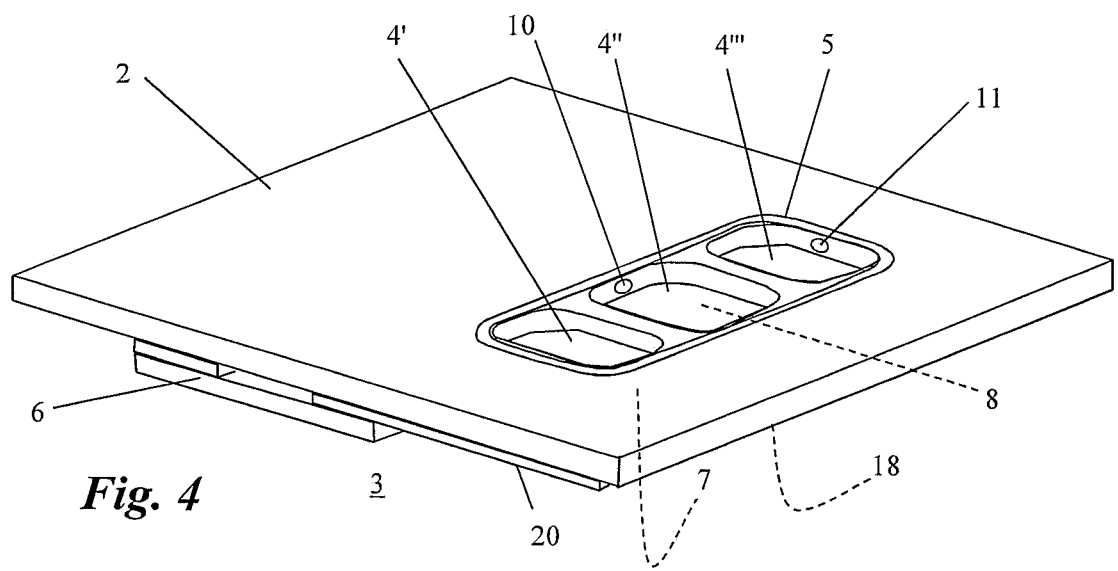
FIG. 4 is a schematic perspective image of a part of an outer side of the outer wall of a process chamber with openings.

FIG. 4 shows a module with a device according to the invention that can be placed in an outer wall 2 of a process chamber 3. The internal guide mechanism 12 contains one or more guide rails 20 and drive pistons, not shown in the figures, that enable movement of the sealing plate parallel to the opening 4 between the open and closed positions. Moreover, in this embodiment, the opening 4 is subdivided into three sub-openings 4', 4" and 4'". The opening 4 may also be implemented without subdivisions or with more or fewer subdivisions.

According to a possible variant of the above embodiment, the external guide mechanism 13 contains one or more fasteners 19 and/or a removable hinge with which the laser window 1 can easily be completely detached from the outer wall 2.

The invention is of course not restricted to the devices or methods described above or to the embodiments proposed in the accompanying figures. For example, the various features of these embodiments and variants may be combined with one another.

What is claimed is:

1. A device for the layered construction of a 3D object by means of a laser comprising:
    a process chamber having an outer wall and configured to contain a modified atmosphere;
    a laser window fitted on the outer wall;
    wherein the outer wall defines at least an opening that is fitted with the laser window and wherein the laser window lets a laser beam from a laser source located outside of the process chamber pass through the opening and into this process chamber to build the 3D object in layers,
    wherein an external sealing ring is provided that extends between the outer wall and the laser window,
    wherein the laser window is movable with respect to the opening,
    wherein a sealing plate is provided that extends into the process chamber and that is movable between an open position and a closed position,
    wherein in the open position of the sealing plate, this sealing plate leaves the opening in the outer wall clear, and
    wherein in the closed position of the sealing plate:
    an internal sealing ring is provided that extends into the process chamber between the sealing plate and the outer wall, around the opening,
    the sealing plate, combined with the internal sealing ring, seals the opening of the process chamber,
    around the opening, a lock chamber is created that is bordered by at least the sealing plate, the internal sealing ring and the laser window,
    wherein one or more of an inlet and an outlet extends into the lock chamber for supply of the modified atmosphere in this lock chamber.

2. A device according to claim 1, wherein the outlet is fitted with a pressure relief valve and/or where the outlet is connected to a vacuum pump for creating a vacuum in the lock chamber.

3. A device according to claim 1, wherein the process chamber contains an internal guide that guides the sealing plate between the open position and the closed position of the sealing plate.

4. A device according to claim 1, further comprising an external guide that guides the laser window between an open position and a closed position of the laser window.

5. A device according to claim 1, wherein the internal sealing ring and/or the external sealing ring contain an inflatable seal.

6. A device according to claim 1, wherein the laser window contains an adapter plate with one or more laser panes.

7. A device according to claim 1, wherein drive means are provided that drive the sealing plate to open the laser window and move it from an open position to a closed position in a first step, and in a subsequent second step, move the laser window with respect to the opening to the open position.

8. A device according to claim 1, wherein the one or more of the inlet and the outlet are made up of a single connecting pipe that alternates between serving as an inlet and outlet.

9. A device for the layered construction of a 3D object by means of a laser comprising:
 a process chamber having an outer wall and defining an opening;
 a laser window having two positional configurations including:
  a first window configuration in which the laser window seals the opening and is positioned to allow the laser to pass through the laser window and into the process chamber; and
  a second window configuration in which the laser window does not seal the opening and is positioned to be cleaned; and
 a sealing plate having two positional configurations including:
  a first plate configuration in which the sealing plate is in an open position in which the sealing plate does not seal the opening and allows the laser to pass through the laser window; and
  a second plate configuration in which the sealing plate seals the opening to allow the laser window to be changed from the first window configuration to the second window configuration while maintaining a seal over the opening.

10. The device of claim 9 wherein a lock chamber is defined between the laser window and the sealing plate when the laser window is in the first window configuration and the sealing plate is in the second plate configuration.

11. The device of claim 9 further comprising an external guide that guides the laser window between the first window configuration and the second window configuration.

12. The device of claim 9 further comprising an internal guide that guides the sealing plate between the first plate configuration and the second plate configuration.

13. The device of claim 9 further comprising a sealing ring for providing sealing between the laser window and the outer wall in the first window configuration.

14. The device of claim 9 further comprising a sealing ring for providing sealing between the sealing plate and the outer wall in the second plate configuration.

* * * * *